May 7, 1935. A. MILES 2,000,568
CHASSIS AND SPRING MOUNTING FOR MOTOR VEHICLES
Filed July 2, 1934

INVENTOR
ARTHUR MILES
By Adam E Fisher
ATTORNEY

Patented May 7, 1935

2,000,568

UNITED STATES PATENT OFFICE 2,000,568

CHASSIS AND SPRING MOUNTING FOR MOTOR VEHICLES

Arthur Miles, New Port Richey, Fla.

Application July 2, 1934, Serial No. 733,433

3 Claims. (Cl. 267—19)

My invention relates to chassis and spring mountings for motor vehicles and the main object is to provide an articulated frame connecting the usual leaf springs to the chassis so that shocks and jars will be taken up not alone by the spring but by this frame and will not be carried to the vehicle chassis, the mounting being thus what is commonly termed floating.

Another object is to provide a mounting of this kind comprising a pair of links disposed with their inner ends overlapping and connected by a shackle, the connected links being then in turn connected by shackles at their outer ends to the chassis and with one link centrally pivoted on the vehicle axle, the usual leaf spring being connected at one end to the center of the other link and at its other end to the chassis and carrying the said axle whereby shocks transmitted to the axle from the wheels will flex said spring and cause the axle to spring upward without raising or jarring the chassis.

With these and other objects in view the invention resides in the novel construction and arrangement of parts as hereinafter fully set forth and claimed, reference being had to the accompanying drawing wherein:

Figure 1:
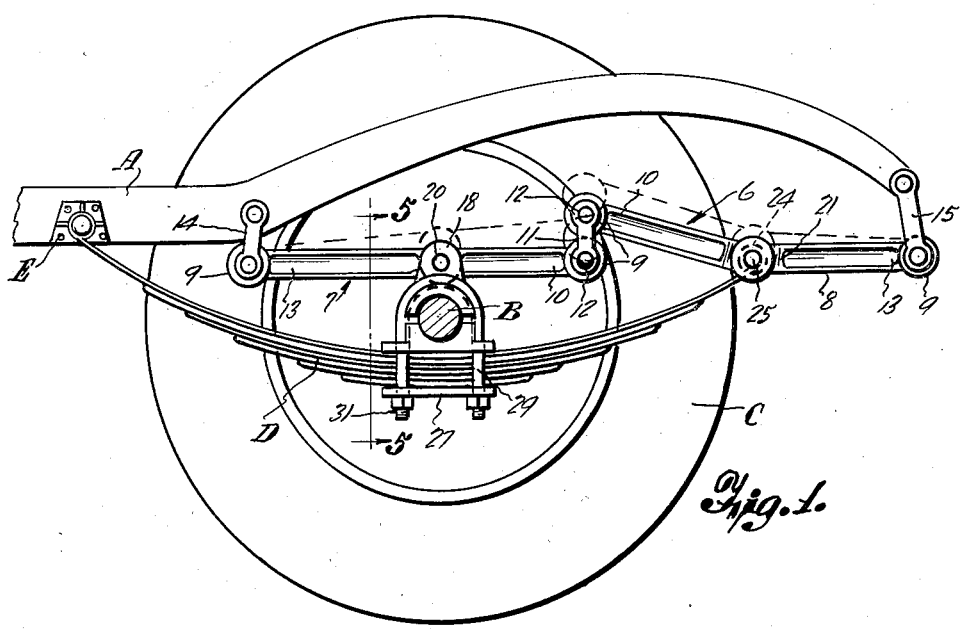
Figure 1 is a side view showing my invention as applied to a vehicle chassis, wheel and axle.
Figure 2:
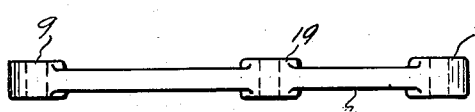
Figure 2 is a plan view of the axle mounting link.
Figure 3:
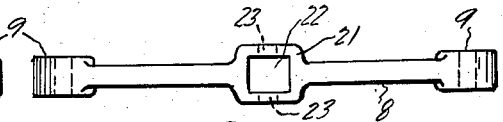
Figure 3 is a plan view of the spring mounting link.
Figure 4:
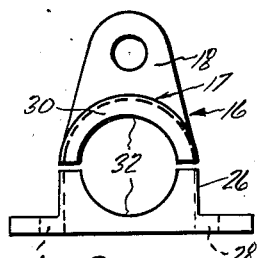
Figure 4 is an enlarged side view of the link mounting brackets for the axle.
Figure 5:
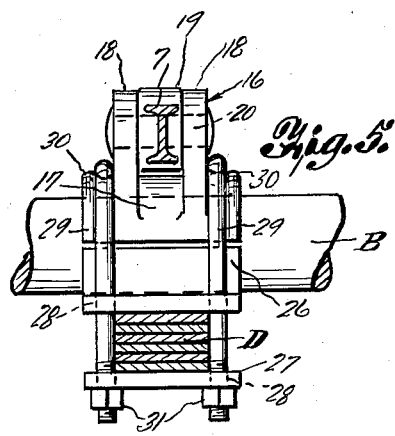
Figure 5 is an enlarged section along the line 5—5 in Figure 1.

Referring now with more particularity to the drawing my invention is shown as applied to the usual motor vehicle chassis including a chassis beam A, axle B and wheel C. The axle here shown is the rear axle but it is understood that my invention may be used as well on either front or rear axles and that one spring and mounting is employed near each end of each axle.

My invention comprises an articulated frame structure 6 made up of an axle mounting link 7 and spring mounting link 8, each of which is of elongated form and I cross section and have enlarged and apertured bearings 9 at their ends. These links 7 and 8 are disposed in aligned or end to end relation with their inner ends 10 overlapping and connected by a conventional shackle 11 having pins 12 journaled through the bearings 9. The spring mounting link 8 is bent into a wide V-shape so that its inner end overlies the inner end of the link 7 and the shackle is disposed vertically as shown. The outer ends 13 of the links 7 and 8 are then connected by conventional shackles 14 and 15 to the chassis beam A with the link 7 disposed forwardly of the other and passing at right angles over the axle B.

A link mounting bracket or clamp 16 is provided having a jaw or saddle 17 designed to seat over the top of the axle B and having a pair of upstanding, apertured bearing ears 18 spaced apart to receive therebetween the link 7. This link has a central apertured bearing 19 which is pivotally mounted between the bearing ears 18 by a pin 20. The spring mounting link 8 has a centrally enlarged spring socket portion 21 having an opening 22 and with aligned apertures 23 through its sides. The leaf spring D of usual form is mounted at one end by a conventional mounting E on the chassis beam A and extends therefrom down beneath the axle B and then up at its other end into the spring socket opening 22 where it is coiled at 24 around a pin 25 passed through the apertures 23. A lower jaw or clamp 26 is placed against the axle B over the spring D and a spring clamp plate 27 is placed in alignment below the spring, the said clamp and clamp plate having aligned apertures 28 at their corners through which the ends of U-bolts 29 are passed. These U-bolts 29 are set over the grooved extended margins or edges 30 of the saddle 17 alongside the ears 18 and nuts 31 are turned up beneath the clamp plate 27 thus clamping both the saddle 17 and the spring D to the axle. The inner faces 32 of the saddle 17 and clamp 26 are here shown as being concave or arcuate to fit the axle B which is of round cross section but this contour may be any suitable to the axle on which the device is mounted.

In operation as the vehicle travels over the road the wheel C when it strikes an obstruction or projection in the road will spring upward and the axle B will do likewise. The spring D will thus be flexed upwardly but the articulation of the links 7 and 8 will allow this upward movement of the axle and spring without elevating the chassis, at least to any great extent. The upward "breaking" of the links as this happens is indicated in dotted lines in Figure 1. Shocks and jars will thus be cushioned from the chassis to a much greater extent than in the usual installations wherein the spring is connected at both ends directly to the chassis. It will be noted that the greatest degree of upward movement is at the junction of the two links 7 and 8 and relatively little movement takes place immediately over the axle B. Fore and aft expansion of the links as they "break" is provided for by the shackles 11, 14 and 15.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In combination with a vehicle chassis, axle and spring, the said spring being connected at one end to the chassis and at its center to the axle, an axle mounting link pivoted intermediate its ends on the axle and connected at one end to the chassis, a spring mounting link connected centrally to the free end of the spring and at one end connected to the chassis, and the other ends of the said links being connected together.

2. In combination with a vehicle chassis, axle and spring, the said spring being connected at one end to the chassis and at its center to the axle, an axle mounting link pivoted intermediate its ends on the axle and connected at one end to the chassis, a spring mounting link connected centrally to the free end of the spring and at one end connected to the chassis, and the other ends of the said links overlapping each other, and a shackle connecting these ends.

3. In combination with a vehicle chassis and axle and a spring connected at one end to the chassis and at its center to the axle, an articulated frame comprising a pair of links overlapping at their inner ends, shackles connecting these inner ends together and connecting the outer ends to the chassis, one link passing over the axle and being pivoted intermediate its ends to the said axle, and the other link having a spring mounting socket intermediate its ends in which the free end of the spring is pivotally mounted.

ARTHUR MILES.